(12) United States Patent
de Oliveira

(10) Patent No.: US 10,020,559 B2
(45) Date of Patent: Jul. 10, 2018

(54) ANTENNA AND APPARATUS COMPRISING ANTENNA

(71) Applicant: Pragmatic Printing Ltd, Sedgefield, County Durham (GB)

(72) Inventor: Joao de Oliveira, Longstanton (GB)

(73) Assignee: Pragmatic Printing Limited, Sedgefield, Durham (GB)

( * ) Notice: Subject to any disclaimer, the term of this patent is extended or adjusted under 35 U.S.C. 154(b) by 242 days.

(21) Appl. No.: 15/100,157

(22) PCT Filed: Nov. 28, 2014

(86) PCT No.: PCT/GB2014/053525
§ 371 (c)(1),
(2) Date: May 27, 2016

(87) PCT Pub. No.: WO2015/079243
PCT Pub. Date: Jun. 4, 2015

(65) Prior Publication Data
US 2017/0264000 A1 Sep. 14, 2017

(30) Foreign Application Priority Data
Nov. 29, 2013 (GB) .................................. 1321110.7

(51) Int. Cl.
*H01Q 1/44* (2006.01)
*H01Q 1/22* (2006.01)
(Continued)

(52) U.S. Cl.
CPC ....... *H01Q 1/2225* (2013.01); *G06K 7/10158* (2013.01); *G06K 19/07783* (2013.01);
(Continued)

(58) Field of Classification Search
CPC .......... H01Q 1/2225; H01Q 1/44; H01Q 7/00; H01Q 1/2216
(Continued)

(56) References Cited

U.S. PATENT DOCUMENTS

| 2002/0160786 A1 | 10/2002 | Rietzler et al. |
| 2003/0024103 A1 | 2/2003 | Kiguchi et al. |

(Continued)

FOREIGN PATENT DOCUMENTS

| JP | H01147078 | 8/1989 |
| JP | 2011066610 A | 3/2011 |

(Continued)

OTHER PUBLICATIONS

International Search Report and Written Opinion of the International Searching Authority, dated Feb. 4, 2015, for corresponding International Application No. PCT/GB2014/053525, 7 pages.
(Continued)

*Primary Examiner* — Andrea Lindgren Baltzell
(74) *Attorney, Agent, or Firm* — Klarquist Sparkman, LLP

(57) ABSTRACT

An antenna comprises: a first terminal; a second terminal; and a winding, having an inductance, comprising a plurality of turns and connected between the first and second terminals such that a change in magnetic flux linking the winding generates a corresponding voltage between said terminals. The winding comprises a conductive element connected to the first and second terminals and extending around said turns from the first terminal to the second terminal and having a thickness not exceeding X μm along a length of the conductive element from the first to the second terminal and a width not exceeding X μm along said length, where X is less than or equal to 10, whereby said conductive element is substantially non-visible to a naked human eye.

24 Claims, 6 Drawing Sheets

(51) Int. Cl.
*H01Q 7/00* (2006.01)
*G06K 19/077* (2006.01)
*G06K 7/10* (2006.01)
*G08B 13/24* (2006.01)
*H04B 5/00* (2006.01)

(52) U.S. Cl.
CPC ....... *G08B 13/2417* (2013.01); *H01Q 1/2216* (2013.01); *H01Q 1/44* (2013.01); *H01Q 7/00* (2013.01); *H04B 5/0081* (2013.01)

(58) Field of Classification Search
USPC .......................................................... 343/870
See application file for complete search history.

(56) References Cited

U.S. PATENT DOCUMENTS

| | | |
|---|---|---|
| 2005/0156700 A1 | 7/2005 | Chang |
| 2007/0128905 A1 | 6/2007 | Speakman |
| 2009/0179822 A1 | 7/2009 | Shinoda et al. |
| 2010/0323102 A1 | 12/2010 | Chopra et al. |
| 2013/0059532 A1 | 3/2013 | Mahanfar et al. |

FOREIGN PATENT DOCUMENTS

| | | |
|---|---|---|
| WO | WO2010/126876 A1 | 11/2010 |
| WO | WO2012/082300 A1 | 6/2012 |

OTHER PUBLICATIONS

Search Report from the United Kingdom Intellectual Property Office for corresponding United Kingdom Application No. GB1321110.7, dated Apr. 14, 2014, 4 pages.

Examination Report from the United Kingdom Intellectual Property Office for corresponding United Kingdom Application No. GB1321110.7, dated Apr. 27, 2016, 7 pages.

Examination Report from the United Kingdom Intellectual Property Office for corresponding United Kingdom Application No. GB1321110.7, dated Oct. 18, 2016, 4 pages.

Polling Device and Listening Device Configuration

ANTENNA AND APPARATUS COMPRISING ANTENNA

CROSS REFERENCE TO RELATED APPLICATIONS

This is the U.S. National Stage of International Application No. PCT/GB2014/053525, filed Nov. 28, 2014, which in turn claims the benefit of and priority to U.K. Patent Application No. GB1321110.7, filed Nov. 29, 2013.

FIELD OF THE INVENTION

The present invention relates to antennas, and in particular, although not exclusively, to antennas for near field communication applications such as tagging and/or security systems.

BACKGROUND OF THE INVENTION

Antennas for a wide variety of applications are well known. Those applications include near field communication (NFC) systems, where the antenna may be the means by which an electronic circuit in a "listening device", tag, or label is wirelessly powered. For example, in such applications, a poling device or source may generate a changing electromagnetic field by means of its own antenna, such that when the antenna of the listening device is in the vicinity of that changing electromagnetic field, a corresponding voltage or EMF is developed across the receiving antenna to power the receiver electronics.

Typically, tags, labels, or other such security devices incorporating the receiving antenna and associated electronic circuit are highly visible. However, it will be appreciated that, for some applications it may be desirable for aesthetic reasons for the tag to be non-visible (in other words substantially transparent). Also, for certain other applications it may be desirable for the tag or label to be non-visible or transparent to the naked human eye for increased security. A potential thief or shoplifter, if not able to see the tagging device, may therefore not be aware of its presence and may not, therefore, be prompted to take measures to avoid the removal of the tagged item being detected. Furthermore, if the person is not aware of the presence of the tagging device, because it is non-visible, then they are not prompted to attempt to remove it.

SUMMARY OF THE INVENTION

It is an aim of certain embodiments of the invention to provide antennas which are not visible to the naked human eye, and which therefore may be incorporated in transparent tagging, security, or electronic inventory items.

According to a first aspect of the invention there is provided an antenna comprising:
a first terminal;
a second terminal; and
a winding, having an inductance, comprising a plurality of turns and connected between the first and second terminals such that a change in magnetic flux linking the winding generates a corresponding voltage between said terminals,
said winding comprising a conductive element connected to the first and second terminals and extending around said turns from the first terminal to the second terminal and having a thickness (i.e. a cross-sectional thickness) not exceeding X μm along a length of the conductive element from the first to the second terminal and a width (i.e. a cross-sectional width) not exceeding X μm along said length, where X is less than or equal to 10, whereby said conductive element is substantially non-visible to a naked human eye.

Another aspect of the invention comprises an antenna comprising an inductive winding, the inductive winding consisting of conductive elements dimensioned so as to be substantially non-visible to the naked human eye.

Further aspects and embodiments of the invention are defined by the claims of this specification.

DETAILED DESCRIPTION

Certain embodiments provide antennas for use in NFC systems, but antennas in accordance with the invention are not limited to NFC applications.

Figure 1:
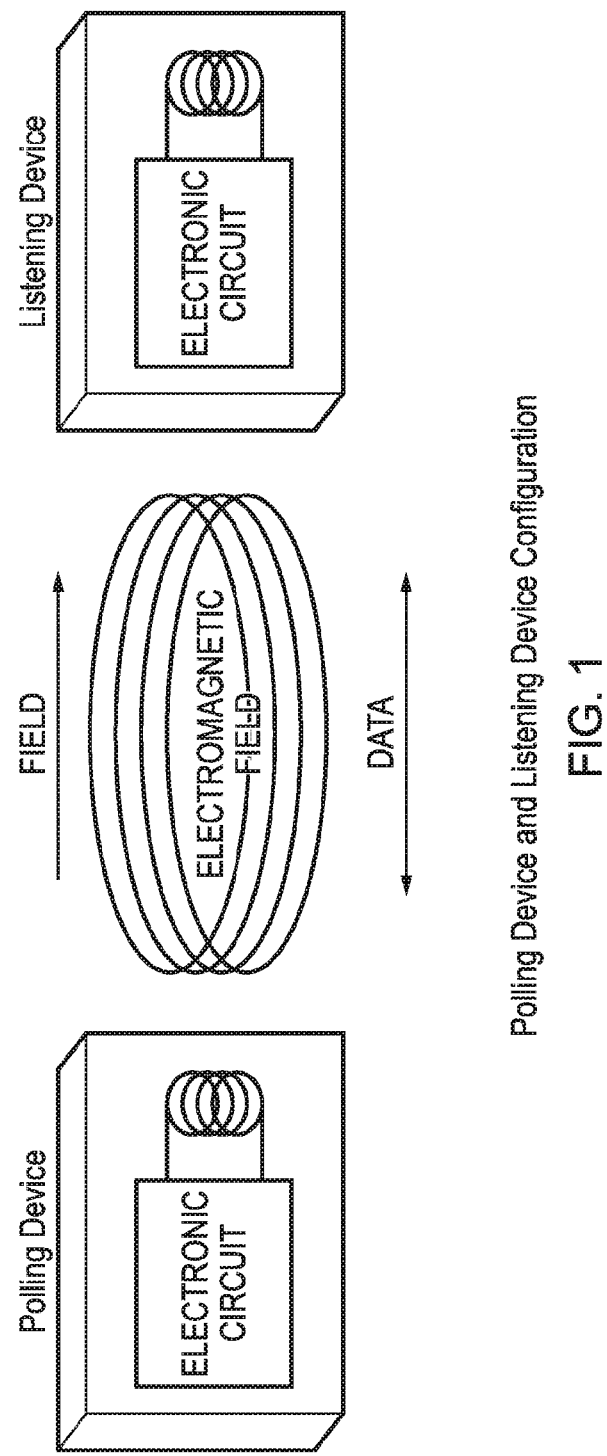
FIG. 1 is a schematic representation of an NFC system in which embodiments of the invention may be incorporated, and which may then embody the invention.

According to "NFC Analog Specification, Technical Specification, NFC Forum™, ANALOG 1.0, NFCForum-TS-Analog-1.0, 2012-07-11", an NFC Forum Device is assumed to be equipped with an antenna connected to an electronic circuit. During operation, the combination of two NFC Forum Devices (Polling Device and Listening Device) behaves like a transformer. An alternating current passes through a primary coil (Polling Device antenna) and creates an electromagnetic field, which induces a current in the secondary coil (Listening Device antenna). The Listening Device may use the electromagnetic field (or RF field) transmitted by the Polling Device to power itself. The configuration and tuning of both antennas determines the coupling efficiency from one device to the other. The Polling Device and Listening Device are shown schematically in FIG. 1.

The addition of information to a signal carrier is called modulation. A signal carrier is characterized by means of its amplitude, phase, and frequency. Therefore, information can be added to the carrier by means of changing one or more of these characteristics. Modulation methods that may be used include:

Amplitude modulation: the level of the signal carrier is varied over time.

Phase modulation: the flow of the signal carrier is either advanced or delayed temporarily, giving a change in phase.

The RF energy transmitted by the Polling Device and received by the Listening Device activates or wakes up the Listening Device and is also used to transport the data through modulation of the carrier. The Listening Device decodes and processes the data and responds to the Polling Device by means of load modulation.

Load modulation is based on the electromagnetic coupling (i.e., mutual inductance) between Listening Device and Polling Device similar to the power transfer and communication from Polling Device to Listening Device. The Listening Device changes the current in its antenna.

The current variation in the Listening Device antenna is sensed by the Polling Device as a small change in the current in its antenna, typically sensed as a small increase in voltage across a resistor in series with the Polling Device antenna.

In certain embodiments the antenna on the "Listening Device" (Tag, label, other . . . ) retrieves the energy allowing the electronics in the "Listening Device" to operate different functions and/or allow communication between the "Listening Device" and the "polling Device".

In certain examples an NFC "antenna" is in fact 2 inductive devices coupled to operate at 13.56 MHz. The "antenna" characteristics of the "polling Device" and the "Listening Device" are specified in the "NFC Analog Specification, Technical Specification, NFC Forum™, ANALOG 1.0, NFCForum-TS-Analog-1.0, 2012-07-11"

To operate the "antenna" in the "Listening Device", the antenna has to have an approximate inductance value of a few uH (micro Henry). This defines a minimum size and windings: typically NFC "Listening Device" "antennas" are 15×15 mm for the smallest, to 100×100 mm for the largest. They are made of copper, silver, (or any other conductor) with line width from a few 100 um to a few mm. The conductor thickness is usually 25 um and above. Depending on the size and geometry they are usually composed of 3 to 7 windings, to stay within the few uH optimum value that NFC needs to operate.

From an optic perspective, the human eye stops perceiving lines at around 5 um width (and indeed lines of width 10 um and narrower may be substantially non-visible to the naked eye), so an antenna with conductive elements (e.g. wires) of 10 um width or less, for example around 9, 8, 7, 6, or 5 um width, becomes virtually "invisible" to the human eye. The smaller the width, of course, the less visible the line becomes.

To get as much energy as possible the thickness of the antenna wires should also be around the same as the width (e.g. 5 um). This can be 5×5 um processed or around 5 um diameter in the case of real wiring, for example, up to perhaps 10×10 um in certain embodiments.

One problem is that an NFC antenna built with 5×5 um wires would still need to have 3 to 7 turns, to stay within the few uH optimum value, that NFC needs to operate, but this would not allow enough energy to be retrieved for some applications, as the physical amount of conductor/free electrons is limited.

By increasing the number of turns, one can increase the amount of energy available, but in the case of NFC, this would bring the "antenna" value outside of required the few uH (micro Henry), for NFC to operate. In the case of different wireless protocols, by increasing the number of turns, one also increases the resistance value of the antenna, therefor quickly limiting its energy output and functionality. This is due to the fact that even a very good conductor/low resistivity (e.g. silver, copper, gold . . . ) with a section of 5×5 um or 5 um diameter, start presenting a non-negligible resistance.

One way to work around this limitation, by using ~5×5 um or 5 um diameter conductor, is to increase the number of turns, but at the same time to parallelise conductive elements within the winding (in effect, subdivide the winding conductor into parallel conductive tracks, each one providing a sub-winding).

Figure 2:
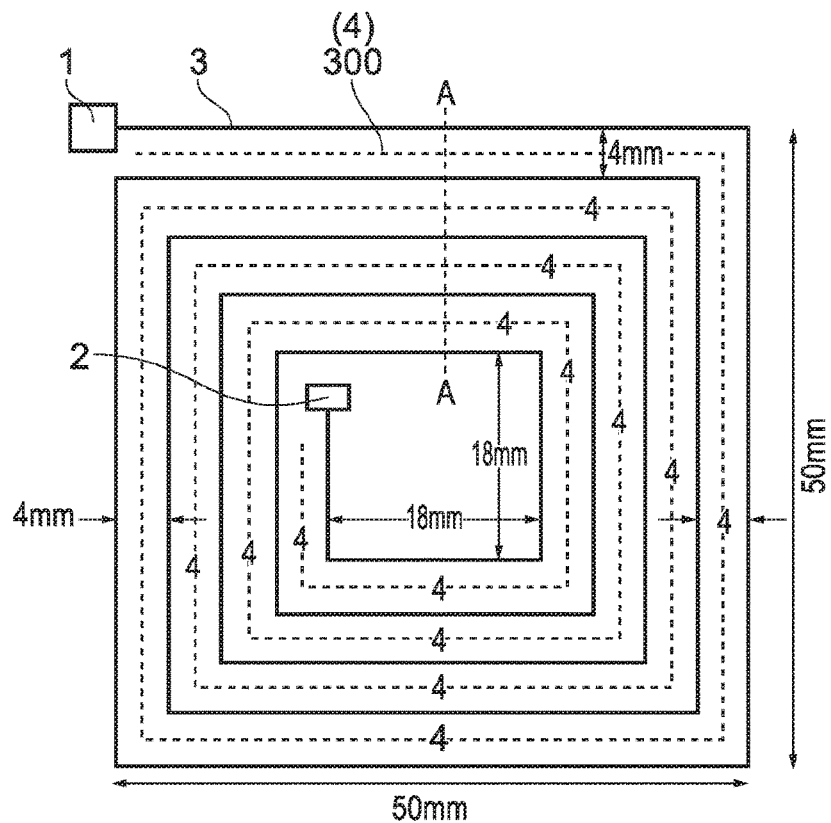
FIG. 2 is a schematic plan view of an antenna in accordance with an embodiment of the invention.
Figure 3:
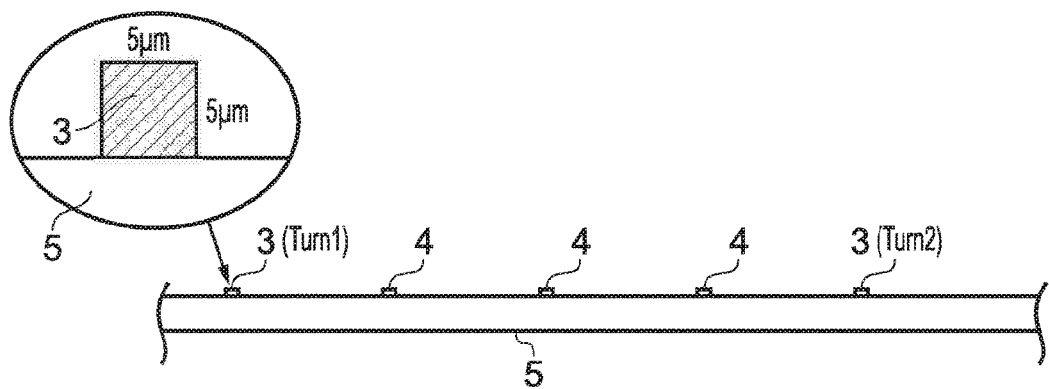
FIG. 3 is a schematic cross section of part of the antenna of FIG. 1.
Figure 4:
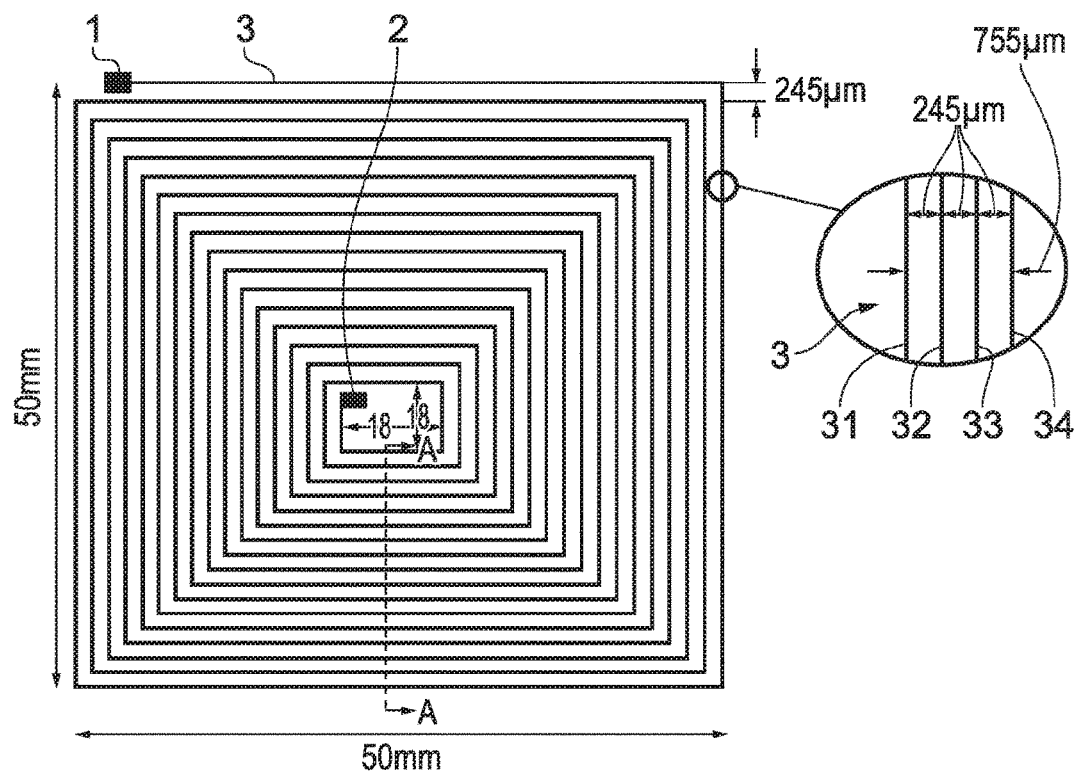
FIG. 4 is a schematic plan view of another antenna embodying the invention.

Referring now to FIGS. 2-10, FIG. 2 shows a first antenna embodying the invention, that antenna being an NFC antenna with a winding 3 comprising 4 turns of a conductive element having cross section 5×5 um. FIG. 4 shows an alternative embodiment with 16 turns (5×5 um), with the winding being made of 4 wires or tracks (5×5 um) in parallel, which has approximately the same resistance value and the same inductance value as the antenna in FIG. 2 but which also is able to provide approximately 16 times more energy (in view of comprising approximately 16 times the total volume of conductor in the winding).

Figure 6:
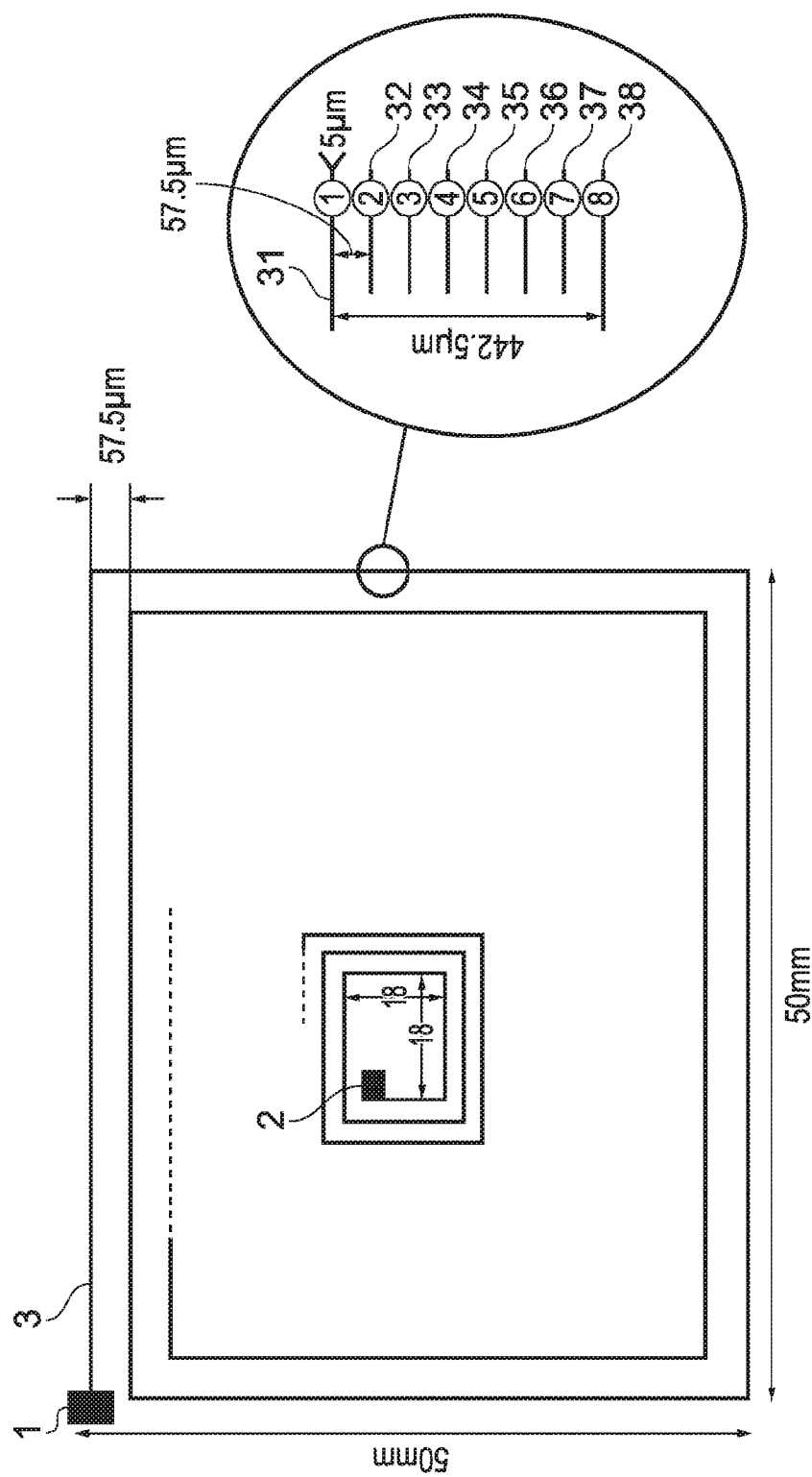
FIG. 6 is a schematic plan view of part of another antenna embodying the invention.

FIG. 6 shows another antenna embodying the invention, this antenna having 32 turns of a winding made of 8 wires (each 5×5 um) in parallel. This antenna has approximately the same resistance value and the same inductance value, as the antenna of FIG. 2, but also has approximately 32 times more energy available than the FIG. 2 antenna.

The ratios of energy gained are approximations, as size, geometry, mutual inductance, material, etc. will impact the exact values. In other words, each conductive element of the winding is an inductor, and the overall inductance of the winding is a function of those individual inductors (which are connected in parallel with one another between the first and second terminals) and their mutual inductances.

Referring again to FIG. 2, in this embodiment the antenna comprises a first terminal 1, a second terminal 2, and a substantially planar, rectangular, spiral winding 3 comprising 4 turns. The overall footprint of the winding is generally square, of side 50 mm. Inside the winding there is a square space of side 18 mm. In this embodiment the inter-turn separation is approximately 4 mm and the winding comprises a single conductive element in the form of a conductive track having a generally rectangular (square in this example) cross section of thickness 5 µm and width 5 µm. It will be appreciated that, in alternative embodiments, the conductive element or track may have a different shape, such as a rectangular cross section, a circular cross section (in which case the track may equally be described as a round wire), or some other shape. However, whatever the cross sectional shape of the conductive element used in embodiments of the invention, it must not have a major dimension exceeding 5 µm, so as to remain substantially non-visible to the naked human eye.

Thus, in FIG. 2 the turns of the winding 3 are shown. The broken line 300 illustrates the position of a further conductive element 4 which may be employed in alternative embodiments, equally spaced between the turns of the winding 3. The further conductive element may, in certain embodiments, have exactly the same cross section as the conductive element of the winding 3, and be formed from the same conductive material. Thus, if the further conductive track has a major dimension (i.e. in this cross section) not exceeding 5 µm, then it, too, is non-visible to the human eye. Advantageously, by arranging the further conductive track in between the turns of the winding 3, but not connecting ends of the further conductive track 300 to the first and second terminals, 1, 2, the appearance of the antenna overall remains substantially uniform, and this helps avoid detection or perception of the antenna conductive track.

Thus, in the embodiment of FIG. 2, a single further conductive element is arranged in between adjacent turns of the winding 3. However, in alternative embodiments, a plurality of further conductive tracks may be employed between adjacent turns of the winding 3, and/or between individual component conductive elements of the winding itself, so as to further fill the spaces between adjacent turns/elements. Thus, to make the optical appearance as discrete as possible, in certain embodiment the surface or space inside the antenna may be filled with non-connected lines (e.g. having the same width as the lines used to form the antenna winding) to create a visual uniformity and avoid any perception of the location with antenna line and without. As the further conductive elements are not connected to the first and second terminals they do not contribute to the inductance of the winding; they contribute to the overall appearance of the antenna, not to its electrical properties.

Referring to FIG. 3, this shows, in schematic form, a cross section of the antenna of FIG. 2 along line A-A. FIG. 3 includes an exploded view of the conductive element in turn 1. In addition to indicating the positions of the conductive track in adjacent turns (in particular turn 1 and turn 2, the figure also illustrates possible positions for further conductive elements 4 in alternative embodiments of the invention. In this embodiment, the winding 3 and optional further conductive elements 4 are supported on a surface of a substrate 5.

Referring now to FIG. 4, this shows a plan view of another antenna embodying the invention. Again, the antenna comprises a spiraling, substantially square winding 3 of side 50 mm, with a square of side 18 mm at its centre. The winding in this example comprises 16 turns. FIG. 4 also includes an exploded view of a single turn of the winding 3, showing that in this example the winding comprises 4 conductive elements (which may be described as conductive tracks or conductive wires) 31, 32, 33, and 34 arranged in parallel with one another. Thus, each conductive element 31, 32, 33, 34 has one end connected to terminal 1, another end connected to terminal 2, and extends from the first to the second terminal around the 16 turns. In effect, these 4 conductive elements, which together form the winding 3, form four inductive windings in parallel with one another between the first and second terminals, 1, 2.

Figure 5:
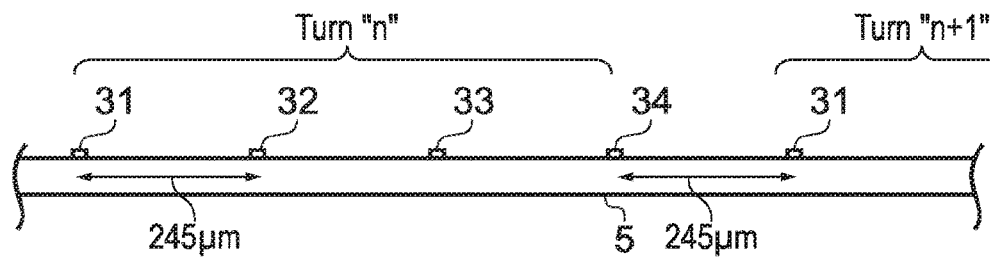
FIG. 5 is a schematic cross section of part of the antenna of FIG. 4.

FIG. 5 shows a schematic cross section of part of the antenna along line A-A. The individual conductive tracks are separated from one another within each turn by a distance of approximately 245 µm and the inter-turn separation in this example is also approximately 245 µm. In this example, each conductive element is again generally square in cross section, having a thickness and width both equal to 5 µm. However, it will be appreciated that in alternative embodiments, different tracks with different cross sections may be used, for example tracks with cross sections having a major dimension smaller than 5 µm. This can help render the antenna even more non-visible, although in general the individual track cross section should be as large as possible, whilst being on the limit of invisibility, to enable the antenna to develop the maximum amount of power for powering a connected electronic circuit.

Figure 7:
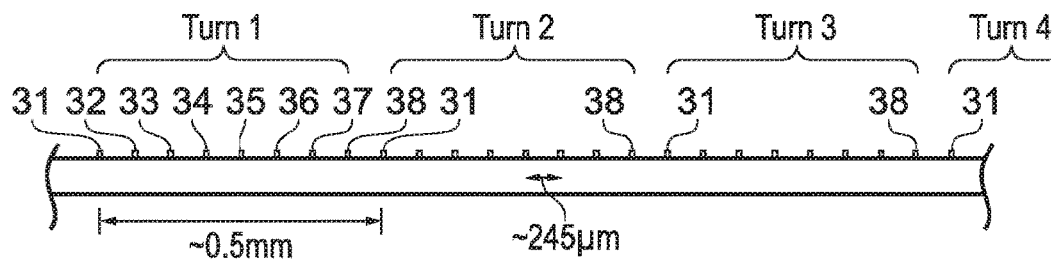
FIG. 7 is a schematic cross section of part of the antenna of FIG. 6.

Referring now to FIG. 6, in this embodiment the winding 3 has 32 turns. The winding comprises a parallel arrangement of 8 separate conductive elements 31-38. FIG. 7 shows the general arrangement of the conductive elements in 2 adjacent turns, with the inter-element separation being 57.5 µm, and the inter-turn separation being approximately 57.5 µm.

Figure 8:
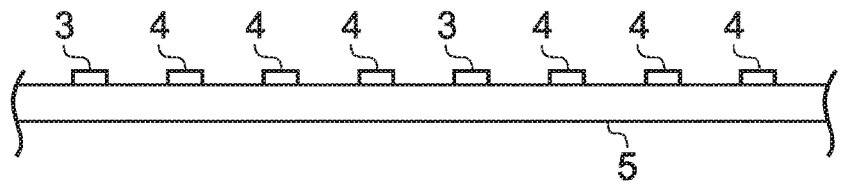
FIG. 8 is a schematic cross section of part of another antenna embodying the invention.

Referring now to FIG. 8, this shows part of an embodiment in which conductive tracks 3 and further conductive tracks 4 of the antenna are supported on the surface of a substantially transparent plastic substrate, which may in certain embodiments be flexible.

Figure 9:
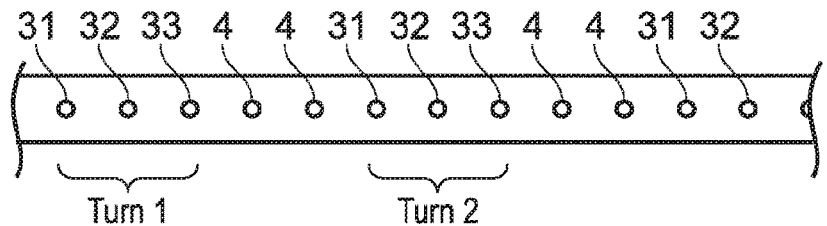
FIG. 9 is a schematic cross section of part of another antenna embodying the invention.

FIG. 9 shows an alternative embodiment in which the conductive elements 31, 32, 33 and further conductive elements 4 of 3 successive turns of the winding 3 are embedded in, encapsulated by, or otherwise contained in the body of a substantially transparent substrate 5.

Figure 10:
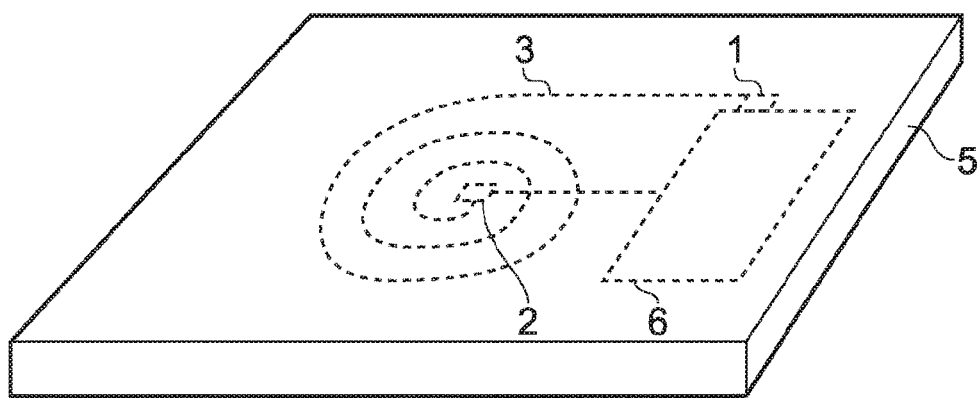
FIG. 10 is a schematic representation of transparent apparatus embodying the invention.

FIG. 10 shows a substantially transparent tag or label in accordance with another embodiment of the invention, comprising a substantially non-visible winding 3, a substantially transparent electronic circuit 6 connected to the first and second terminals 1, 2, and an encapsulating body 5 of substantially transparent plastic material containing the winding, terminals and circuit 6. The winding in this example is a generally circular spiral, but it will be appreciated that alternative embodiments may comprise different antenna shapes and/or geometries to suit particular requirements or applications. For example, in certain embodiments, the antenna may be round, oval, triangular, generally symmetrical, generally asymmetrical etc.

Figure 11:
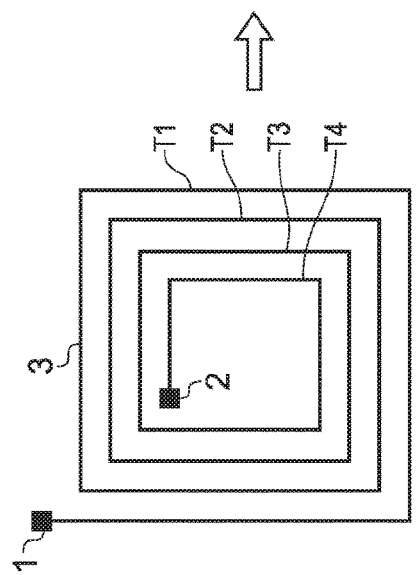
FIG. 11 is a schematic representation of another embodiment.

Referring now to FIG. 11, this shows another antenna embodying the invention. The antenna comprises a winding 3 of four turns (T1, T2, T3, T4) of a single wire having a diameter of less than or equal to 10 um. In alternative embodiments the winding may be formed of substantially square/rectangular cross section, of maximum side no greater than 10 um. Certain embodiments comprise conductive elements of diameter or side less than or equal to 9, 8, 7, 6, or 5 um, or even smaller.

Figure 12:
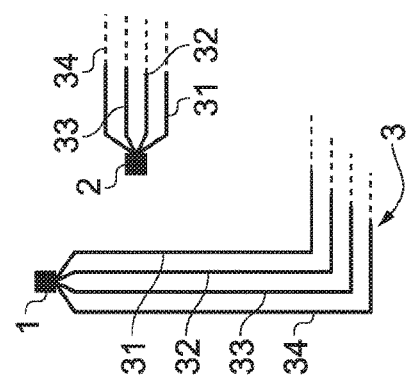
FIG. 12 is a schematic representation of part of another embodiment.

FIG. 12 shows part of an alternative embodiment in which the winding 3 comprises 16 turns of 4 conductive elements 31-34 arranged in parallel between the first and second terminal 1, 2, each conductive element having the same cross sectional area as the single wire of FIG. 11. The winding of FIG. 12 (16 turns) has approximately four times the length of the winding of FIG. 11, but as the overall cross sectional area of the four conductive elements in the FIG. 12 winding is four times greater than the cross sectional area of the single wire of FIG. 11, the resistances of the two different windings is substantially the same.

Thus, certain embodiments may comprise a winding comprising 4 turns of 1 conductive element (line, track, or wire), 8 turns of 2 elements, 12 turns of 3 elements, 16 turns of 4 elements etc., where each element has the same cross-sectional area, and the windings will have substantially the same resistance. They may also have substantially the same inductance value. Increasing the number of turns and correspondingly increasing the number of conductive elements arranged in parallel to form the winding also increases the power output achievable with the antenna.

Figure 13:
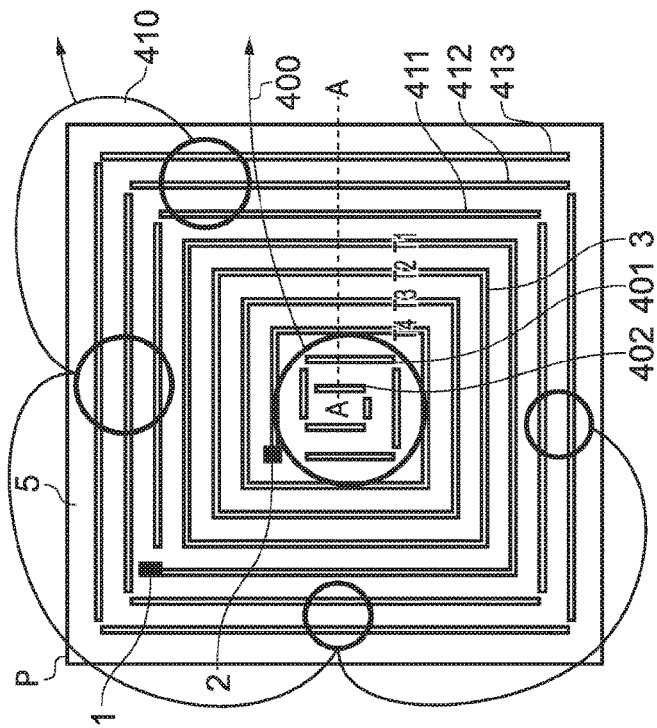
FIG. 13 is a schematic representation of another embodiment.

Referring now to FIG. 13, this shows another embodiment of the invention comprising extra conductive elements (lines, tracks, wires etc.) 411, 412, 413, 401, 402 (and others not allocated reference numerals in the figure) arranged to make the antenna winding 3 less visible. In other words, the extra (further) conductive elements help mask the location of the antenna winding as they result in a larger area having a substantially uniform appearance. In this embodiment the antenna winding 3 comprises four turns (T1-T4) of a single substantially square-sectioned conductive track. The further conductive elements are not electrically connected to the winding 3, but are arranged such that they generally appear to be continuations of the winding, both outside the winding and inside the winding. These further or extra conductive elements each have the same cross-sectional area as the track forming the winding, and they have the same uniform spacing as the winding turns. The extra conductive elements 410 outside the winding 3 consist of a series of ten straight or linear conductive tracks (including 411, 412, and 413, of which 413 is the last in the series) which appear to extend the winding outwards by an extra 2.5 turns, but these straight tracks do not connect to each other; there are gaps between them at the corners of the apparent extra turns. Similarly, the extra conductive tracks 400 inside the winding 3 consist of a series of seven straight or linear conductive tracks (including 401 and 402, of which 402 is the last in the series) which appear to extend the winding inwards by an extra 1.75 turns, and again these straight tracks do not connect to each other; there are gaps between them at the corners of the apparent extra turns. Thus, the extra elements 400 inside the winding 3 substantially fill the space inside the winding, giving that space the same general appearance as a portion of the winding itself. Thus, the extra tracks inside the winding help avoid a person perceiving the winding by being aware of a gap at its centre. The outer "extension" 410 similarly masks the outer extent or extremity of the winding. The substantially transparent substrate 5 supporting the winding 3 and extra elements is substantially square in this example, and its perimeter P (or edge, or extremity) is indicated in the figure. Thus, it will be appreciated that providing the extra elements, essentially filling the space inside the winding and the space outside the winding (i.e. between the winding and perimeter of the substrate) the antenna has a substantially uniform optical transmittance over its entire area. This helps avoid a person perceiving the winding (which otherwise, depending on the thickness/width/material could be perceived, even though the conductive element may be too narrow to be resolved as such). In the example shown in FIG. 13, the winding comprises a plurality of turns of just a single conductive element. However, in alternative embodiments, as will be appreciated from the above description, the winding may comprise a plurality of turns of a plurality of conductive elements in parallel. In such embodiments, although the individual conductive elements may be too small to be resolved by the naked human eye, the arrangement of parallel conductive elements of course has a greater overall width, and could be perceived by a person if it represented a region of different transmittance compared with an adjacent area of substrate with no conductive elements present. Thus, in embodiments employing windings of a plurality of conductive elements in parallel, extra conductive elements (arranged in parallel with one another, so as to resemble continuations of the winding, inside and outside the winding as necessary to "fill" or occupy the desired area of substrate) may be employed in a manner generally as described with reference to FIG. 13, and so give the desired area of substrate/support means a substantially uniform transmittance, so preventing perception of the winding.

Figure 14:
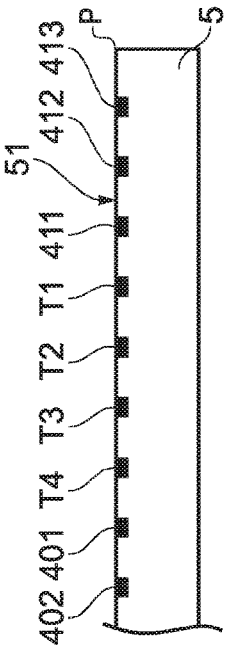
FIG. 14 is schematic representation of part of the cross section of the antenna of FIG. 13, along line A-A from FIG. 13.

FIG. 14 shows a cross section of the antenna of FIG. 13 along line A-A. A transparent substrate 5 supports the winding 3 and the extra conductive elements 410, 400. In this example, each conductive element (of the winding and the extra tracks) is formed in a respective recess, groove, or trench in a surface 51 of the substrate 5, and substantially fills that recess, groove, or trench. The elements 402, 401, turns T4-T1, and elements 412, 413 are equally spaced along the cross section. In certain embodiments, the conductive elements (wires, tracks etc.) can be implemented as an additive process to the substrate. In certain embodiments, the conductive elements can be formed in recesses, the cross-sectional dimensions of each recess determining the cross-sectional area of each conductor.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An antenna comprising:
   a first terminal;
   a second terminal; and
   a winding, having an inductance, comprising a plurality of turns and connected between the first and second terminals such that a change in magnetic flux linking the winding generates a corresponding voltage between said terminals,
   wherein said winding comprises a plurality of conductive elements connected in parallel with one another between the first and second terminals, each conductive element being connected to the first and second terminals and extending around said turns from the first terminal to the second terminal and having a thickness not exceeding X μm along a length of the conductive element from the first to the second terminal and a width not exceeding X μm along said length, where X is less than or equal to 10.

2. An antenna in accordance with claim 1, wherein the plurality of conductive elements are arranged such that a separation between any adjacent pair of said conductive elements around said plurality of turns is at least X μm.

3. An antenna in accordance with claim 1, the antenna further comprising at least one further conductive element arranged between an adjacent pair of said conductive elements and extending at least partly around said turns, the or each further conductive element not being connected to the first or second terminals, but having a first end and a second end and a thickness and a width each not exceeding X μm from said first end to said second end.

4. An antenna in accordance with claim 1, the antenna further comprising at least one further conductive element arranged between adjacent turns of said winding and extending at least partly around said turns, the or each further conductive element not being connected to the first or second terminals, but having a first end and a second end and a thickness and a width each not exceeding X μm from said first end to said second end.

5. An antenna in accordance with any one of claim 3 wherein the conductive and further conductive elements are arranged such that in a direction across the plurality of turns a spacing between each conductive or further conductive element and the adjacent conductive or further conductive element is substantially constant (uniform).

6. An antenna in accordance with claim 1, wherein a spacing between adjacent turns of the winding, from the first to the second terminal, is at least X μm.

7. An antenna in accordance with claim 1, further comprising support means arranged to support said winding.

8. An antenna in accordance with claim 7, wherein the support means is arranged to support each further conductive element.

9. An antenna in accordance with claim 7, wherein the support means is arranged to support said first and second terminals.

10. An antenna in accordance with claim 7, wherein the support means comprises a substrate having a surface, at least the winding being supported on said surface.

11. An antenna in accordance with claim 7, wherein the support means comprises a substrate having a surface, and each conductive element is arranged in a respective recess in said surface.

12. An antenna in accordance with claim 11, wherein each conductive element fills its respective recess.

13. An antenna in accordance with claim 7, wherein the support means comprises a body of electrically insulative material and the winding is encapsulated, embedded or otherwise contained in said body.

14. An antenna in accordance with claim 7, wherein the support means is at least substantially transparent to visible light.

15. An antenna in accordance with claim 7, wherein said support means is at least one of: flexible; plastic; planar.

16. An antenna in accordance with claim 1, wherein said winding is substantially planar.

17. An antenna in accordance with claim 1, wherein said winding is generally spiral, with each turn except the first turn being inside a preceding turn.

18. An antenna in accordance with claim 1, wherein said winding is generally rectangular.

19. An antenna in accordance with claim 1, wherein the antenna is an NFC antenna.

20. An antenna in accordance with claim 1, wherein X is less than or equal to 7 μm.

21. An antenna in accordance with claim 1, wherein X is less than or equal to 6 μm.

22. An antenna in accordance with claim 1, wherein X is less than or equal to 5 μm.

23. Apparatus comprising an antenna in accordance with claim 1 and an electronic circuit, said circuit being connected to said antenna, for example to said first and second terminals, and arranged to be powered by said antenna.

24. Apparatus in accordance with claim 23, wherein said apparatus is one of: an electronic tag; an NFC listening device; an electronic security label; and an electronic identification tag or label.

* * * * *